United States Patent
Miyano et al.

(10) Patent No.: US 11,537,211 B2
(45) Date of Patent: Dec. 27, 2022

(54) DISPLAY APPARATUS, DISPLAY METHOD, AND RECORDING MEDIUM RECORDING DISPLAY PROGRAM HAVING MOVEMENT AMOUNT CORRECTOR

(71) Applicant: SHARP KABUSHIKI KAISHA, Sakai (JP)

(72) Inventors: Yasuhiro Miyano, Sakai (JP); Takashi Yamamoto, Sakai (JP); Kohichi Sugiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/548,244

(22) Filed: Dec. 10, 2021

(65) Prior Publication Data
US 2022/0197395 A1 Jun. 23, 2022

(30) Foreign Application Priority Data
Dec. 17, 2020 (JP) .............................. JP2020-209251

(51) Int. Cl.
*G06F 3/01* (2006.01)

(52) U.S. Cl.
CPC .............. *G06F 3/017* (2013.01); *G06F 3/011* (2013.01)

(58) Field of Classification Search
CPC ........ G06F 3/017; G06F 3/011; G06F 3/0482; G06F 3/0346; G06F 3/0486; G06V 40/20
See application file for complete search history.

(56) References Cited

U.S. PATENT DOCUMENTS

| | | | |
|---|---|---|---|
| 2011/0141009 A1 | 6/2011 | Izumi | |
| 2011/0193939 A1* | 8/2011 | Vassigh | G06F 3/011 348/169 |
| 2012/0102437 A1* | 4/2012 | Worley | G06F 3/0486 345/173 |
| 2013/0033483 A1* | 2/2013 | Im | G06F 3/0482 345/419 |
| 2015/0363070 A1* | 12/2015 | Katz | G06F 3/0482 715/852 |
| 2019/0087020 A1* | 3/2019 | Robinson | G06F 3/0346 |
| 2020/0363874 A1* | 11/2020 | Bedi | G06V 40/20 |

FOREIGN PATENT DOCUMENTS

JP 2010-015553 A 1/2010

* cited by examiner

*Primary Examiner* — Richard J Hong
(74) *Attorney, Agent, or Firm* — ScienBiziP, P.C.

(57) ABSTRACT

A display apparatus that includes a movement amount acquirer, a movement amount corrector, and an input processor is provided. The display apparatus acquires a first movement amount of a user's finger in a vertical direction with respect to a virtual operation surface and a second movement amount thereof in a horizontal direction. The display apparatus corrects the first movement amount or the second movement amount when it determines that the input operation is a predetermined operation, and inputs an input operation based on the first movement amount and the second movement amount. When it is determined that the input operation is to move the user's finger in the vertical direction with respect to the virtual operation surface, the display apparatus corrects the second movement amount.

8 Claims, 16 Drawing Sheets

DISPLAY APPARATUS, DISPLAY METHOD, AND RECORDING MEDIUM RECORDING DISPLAY PROGRAM HAVING MOVEMENT AMOUNT CORRECTOR

INCORPORATION BY REFERENCE

This application is based upon and claims the benefit of priority from the corresponding Japanese Patent Application No. 2020-209251 filed on Dec. 17, 2020, the entire contents of which are incorporated herein by reference.

BACKGROUND

The present disclosure relates to a display apparatus, a display method, and a recording medium recording a display program, the display screen, the display method, and the display program accepting a user's non-contact input operation for a display screen.

Conventionally, a display apparatus that allows a non-contact input operation (a screen operation) such as an instruction operation for a display screen of a display panel has been known. For example, such a system has been known that forms a virtual operation surface accepting an operator's operation on the basis of a captured image of the operator, reads the operator's action from the captured image, and determines whether such action is the operation on the basis of a positional relationship between a part of the operator and the virtual operation surface.

However, in the related art, it is difficult for a user to visually recognize the set virtual operation surface. Thus, there is a case of misalignment of the input operation to the virtual operation surface. For example, when the user moves his/her finger in a depth direction on the virtual operation surface to select a selection button that is displayed on the display screen, the finger may also move in a right-left direction, which is unintended by the user, in addition to the depth direction. In this case, a selection operation for a different position from a position aimed by the user is accepted, which results in such a problem that processing unintended by the user is executed.

SUMMARY

An object of the present disclosure is to provide a display apparatus, a display method, and a recording medium recording a display program, the display apparatus, the display method, and the display program capable of suppressing misalignment of a user's input operation to a virtual operation surface in the display apparatus that accepts the user's non-contact input operation for a display screen.

A display apparatus according to one aspect of the present disclosure is a display apparatus that accepts a non-contact input operation by a user for a display screen, and includes: a movement amount acquirer that acquires a first movement amount and a second movement amount in the input operation by the user on a virtual operation surface corresponding to the display screen, the first movement amount being a movement amount of an operation designator of the user in a vertical direction with respect to the virtual operation surface, and the second movement amount being a movement amount of the operation designator of the user in a horizontal direction with respect to the virtual operation surface; an input operation determination device that determines whether the input operation is a predetermined operation; a movement amount corrector that executes correction processing to correct the first movement amount or the second movement amount in the case where the input operation determination device determines that the input operation is the predetermined operation; and an input processor that executes input processing corresponding to the input operation on the basis of the first movement amount and the second movement amount, one of which has been subjected to the correction processing. In the case where the input operation determination device determines that the input operation is a first operation to move the operation designator of the user in the vertical direction with respect to the virtual operation surface, the movement amount corrector executes the correction processing to reduce or ignore the second movement amount.

A display method according to another aspect of the present disclosure is a display method that accepts a non-contact input operation by a user for a display screen, one or a plurality of processors: acquiring a first movement amount and a second movement amount in the input operation by the user on a virtual operation surface corresponding to the display screen, the first movement amount being a movement amount of an operation designator of the user in a vertical direction with respect to the virtual operation surface, and the second movement amount being a movement amount of the operation designator of the user in a horizontal direction with respect to the virtual operation surface; determining whether the input operation is a predetermined operation; executing correction processing to correct the first movement amount or the second movement amount in the case where it is determined in the input operation determination that the input operation is the predetermined operation; and executing input processing that corresponds to the input operation on the basis of the first movement amount and the second movement amount, one of which has been subjected to the correction processing. In the case where it is determined in the input operation determination that the input operation is a first operation to move the operation designator of the user in the vertical direction with respect to the virtual operation surface, in the correction, the correction processing is executed to reduce or ignore the second movement amount.

A recording medium according to further another aspect of the present disclosure is a recording medium that records a display program for accepting a non-contact input operation by a user for a display screen, the recording medium recording the display program causing one or a plurality of processors to execute: acquiring a first movement amount and a second movement amount in the input operation by the user on a virtual operation surface corresponding to the display screen, the first movement amount being a movement amount of an operation designator of the user in a vertical direction with respect to the virtual operation surface, and the second movement amount being a movement amount of the operation designator of the user in a horizontal direction with respect to the virtual operation surface; determining whether the input operation is a predetermined operation; executing correction processing to correct the first movement amount or the second movement amount in the case where it is determined in the input operation determination that the input operation is the predetermined operation; and executing input processing that corresponds to the input operation on the basis of the first movement amount and the second movement amount, one of which has been subjected to the correction processing. In the case where it is determined in the input operation determination that the input operation is a first operation to move the operation designator of the user in the vertical direction with respect to the virtual operation surface, in the correction, the correction processing is executed to reduce or ignore the second movement amount.

According to the present disclosure, it is possible to suppress misalignment of the user's input operation on the virtual operation surface in the display apparatus that accepts the user's non-contact input operation for the display screen.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A description will hereinafter be made on an embodiment of the present disclosure with reference to the accompanying drawings. The following embodiment is an example in which the present disclosure is embodied, and does not intend to limit the technical scope of the present disclosure.

Figure 1:
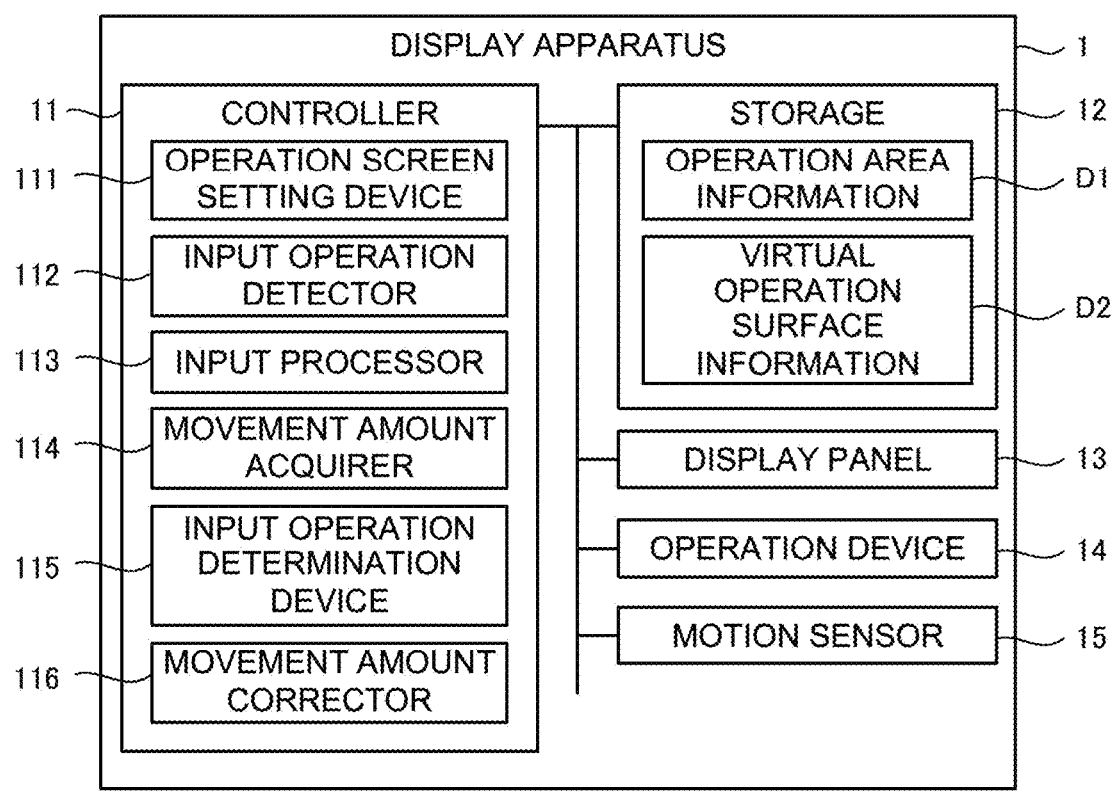
FIG. 1 is a block diagram illustrating a configuration of a display apparatus according to an embodiment of the present disclosure.
Figure 2:
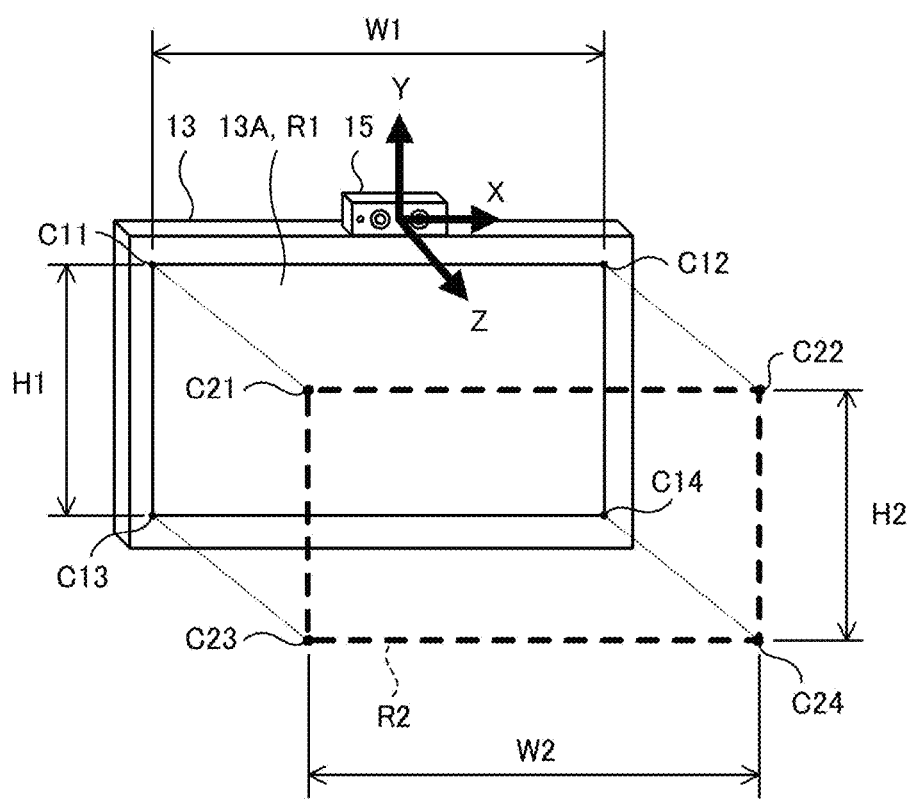
FIG. 2 is a schematic view illustrating an example of a virtual operation surface in the display apparatus according to the embodiment of the present disclosure.

As illustrated in FIG. 1, a display apparatus 1 according to the embodiment of the present disclosure includes a controller 11, a storage 12, a display panel 13, an operation device 14, and a motion sensor 15. FIG. 2 is a schematic view of the display apparatus 1. The motion sensor 15 is installed on top of the display panel 13 and detects a user's operation.

The display apparatus 1 accepts the user's non-contact input operation for a display screen 13A. For example, when detecting the user's input operation on a virtual operation surface R2, the display apparatus 1 executes input processing that corresponds to the user's input operation for the display screen 13A. For example, when the user touches a predetermined position in the virtual operation surface R2, the display apparatus 1 detects a position on the display screen 13A that corresponds to the touch position on the virtual operation surface R2, and accepts the touch input. A description will hereinafter be made on a specific configuration of the display apparatus 1.

The motion sensor 15 includes two cameras and three infrared LEDs, for example, and detects the user's input operation within a predetermined detection range. The motion sensor 15 outputs detection information to the controller 11. The detection information includes position coordinates (an X-coordinate, a Y-coordinate, and a Z-coordinate) of a detection target (for example, the user's hand, fingertip, stylus pen, pointer, or the like) with the motion sensor 15 being a reference. The motion sensor 15 can detect a back (a palm), a finger joint, a fingertip, and the like of the user's hand (right hand RH or left hand LH), for example. The well-known technique can be applied to the motion sensor 15.

The display panel 13 is a display that displays images, and an example thereof is a liquid crystal display. The operation device 14 is operation equipment such as a mouse and a keyboard. The operation device 14 may be constructed of a touch panel.

The storage 12 is a non-volatile storage such as a hard disk drive (HDD) or a solid state drive (SSD) that stores various types of information.

More specifically, the storage 12 stores data such as operation area information D1 and virtual operation surface information D2.

The operation area information D1 is information on an operation area R1 in the display screen 13A of the display panel 13. The operation area R1 is an area of the display screen 13A where the user can perform the input operation via the virtual operation surface R2, that is, an area that can accept the user's input operation. The operation area R1 may be set for an entire area of the display screen 13A or may be set for a partial area of the display screen 13A. For example, in the case where the entire area of the display screen 13A is set as the operation area R1, the operation area information D1 includes, as coordinate information that defines the operation area R1, information on coordinates C11 to C14 (see FIG. 2) of four corners of the display screen 13A. The operation area information D1 is registered in the storage 12 every time the operation area R1 is set or updated.

The virtual operation surface information D2 is information on an area of the virtual operation surface R2 that accepts the user's input operation for the display screen 13A. More specifically, the virtual operation surface R2 corresponds to the operation area R1, and coordinates C21 to C24 (see FIG. 2) of four corners that define the virtual operation surface R2 respectively correspond to the coordinates C11 to C14 that define the operation area R1. The virtual operation surface information D2 includes information on the coordinates C21 to C24 of the four corners that define the virtual operation surface R2. The virtual operation surface information D2 is registered in the storage 12 every time the virtual operation surface R2 is set or updated. Size and a position of the virtual operation surface R2 may be set in advance or may be set by the user's operation.

In addition, the storage 12 stores a control program such as a display control program for causing the controller 11 to execute display control processing (see FIG. 7), which will be described below. For example, the display control program is recorded non-temporarily in a computer-readable recording medium such as a CD or a DVD, is read by a reader (not illustrated) such as a CD drive or a DVD drive provided in the display apparatus 1, and is stored in the storage 12. However, the display control program may be distributed from a cloud server and stored in the storage 12.

The controller 11 includes control equipment such as a CPU, ROM, and RAM. The CPU is a processor that executes various types of arithmetic processing. The ROM is a non-volatile storage that stores, in advance, a control program such as BIOS or OS for causing the CPU to execute the various types of the arithmetic processing. The RAM is a volatile or non-volatile storage that stores various types of information, and is used as temporary storage memory (working area) for various types of processing executed by the CPU. The controller 11 controls the display apparatus 1 by causing the CPU to run various types of the control programs that are stored in advance in the ROM or the storage 12.

More specifically, as illustrated in FIG. 1, the controller 11 includes various processing devices such as an operation surface setting device 111, an input operation detector 112, an input processor 113, a movement amount acquirer 114, an input operation determination device 115, and a movement amount corrector 116. The controller 11 functions as the operation surface setting device 111, the input operation detector 112, the input processor 113, the movement amount acquirer 114, the input operation determination device 115, and the movement amount corrector 116 when the CPU executes various types of processing according to the display control program. Some or all of the processing devices included in the controller 11 may be constructed of an electronic circuit. The display control program may be a program for causing plural processors to function as the various types of the processing devices.

The operation surface setting device 111 sets the virtual operation surface R2 that accepts the user's input operation. For example, as illustrated in FIG. 2, the operation surface setting device 111 sets the virtual operation surface R2 at a position away from the display screen 13A by a predetermined distance in a Z-direction. The operation surface setting device 111 may set the virtual operation surface R2 in preset size at a preset position, or may set the virtual operation surface R2 in size corresponding to the user's operation at a position specified by the user. For example, the user can set the virtual operation surface R2 in desired size at a desired position by performing a predetermined gesture operation (a detail thereon will be described below).

The input operation detector 112 detects the user's input operation. More specifically, the input operation detector 112 detects the user's input operation on the virtual operation surface R2, which is set by the operation surface setting device 111. For example, the input operation detector 112 detects detection coordinates in the virtual operation surface R2 on the basis of the detection information that is acquired from the motion sensor 15, and calculates input coordinates in the operation area R1 from the detection coordinates. The input operation is a touch input operation to the image displayed on the display screen 13A.

Here, in the case where it is assumed that a ratio of the virtual operation surface R2 to the operation area R1 is "W2:W1=H2:H1=a:b" (see FIG. 2), based on the detection coordinates [sx, sy] in the virtual operation surface R2, the input operation detector 112 can calculate the input coordinates [dx, dy] by formulae dx=sx×b/a, and dy=sy×b/a. Here, display resolution [rx, ry] is Min [dx, dy]=[0, 0], and Max [dx, dy]=[dx, dy].

In the case where the input operation detector 112 detects the user's input operation on the virtual operation surface R2, the input processor 113 executes the input processing that corresponds to the user's input operation for the display screen 13A. For example, in the case where the input operation detector 112 detects the user's touch operation on the virtual operation surface R2 for an object image that is displayed on the display screen 13A, the input processor 113 detects a position on the display screen 13A that corresponds to the touch position, and accepts the touch input.

Figure 3:
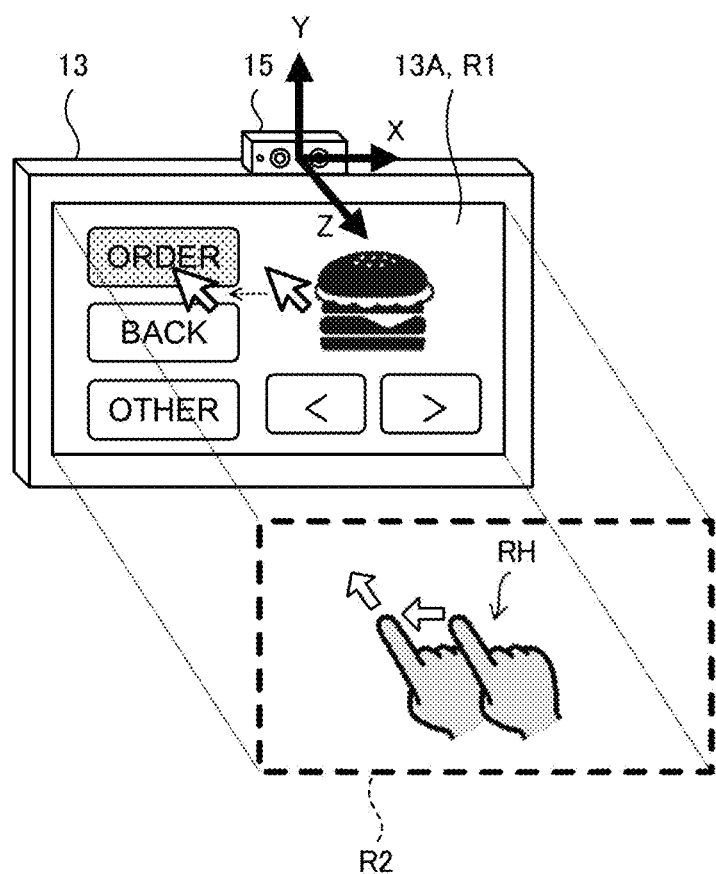
FIG. 3 is a view illustrating an example of an input operation in the display apparatus according to the embodiment of the present disclosure.

For example, in the case where selection button images "ORDER", "BACK", and "OTHER" are displayed as the object images on a product order screen illustrated in FIG. 3, and the user moves his/her right hand RH in the up-down, right-left directions (an X-direction and a Y-direction) on the virtual operation surface R2, the input processor 113 moves a cursor image on the display screen 13A according to the movement operation. When ordering a desired product, in order to press the selection button image "ORDER" displayed on the display screen 13A, the user performs an operation (a selection operation) to push in the finger of his/her right hand RH to the display panel 13 side (in the Z-direction) in a state where the cursor image overlaps the selection button image "ORDER". When the input operation detector 112 detects the selection operation, the input processor 113 executes processing that is assigned to the selection button image corresponding to the selection operation. Here, the input processor 113 executes order processing that is assigned to the selection button image "ORDER". In this way, at a location away from the display screen 13A, the user can perform the input operation for the operation area R1.

Figure 4:
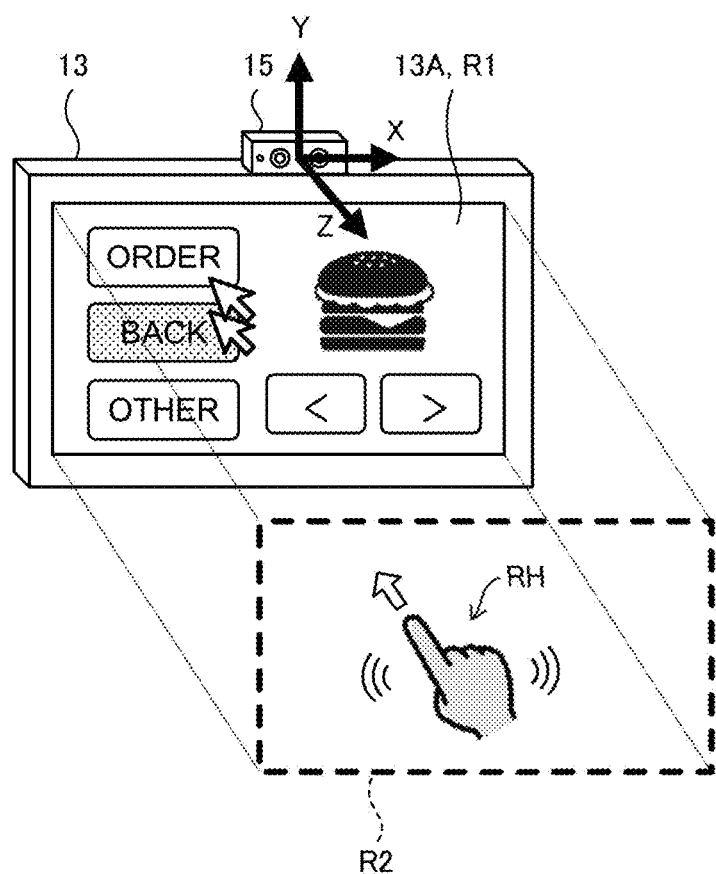
FIG. 4 is a view illustrating an example of an input operation in a conventional display apparatus.

By the way, in the related art, it is difficult for the user to visually recognize the set virtual operation surface R2. Thus, there is a case of misalignment of the input operation to the virtual operation surface R2. For example, as illustrated in FIG. 4, in the case where the user moves his/her finger to the display panel 13 side (in the Z-direction) on the virtual operation surface R2 in order to select the selection button image "ORDER" that is displayed on the display screen 13A, there is a case where his/her finger moves in the right-left direction (the X-direction and the Y-direction), which is unintended by the user, in addition to the Z-direction. In this case, the selection operation for a position that is shifted from the position aimed by the user, for example, the selection operation of the selection button image "BACK" is accepted, which results in such a problem that processing unintended by the user is executed. To handle such a problem, the display apparatus 1 according to this embodiment can suppress the misalignment of the user's input operation to the virtual operation surface R2. A description will hereinafter be made on a specific configuration for suppressing the misalignment.

In the user's input operation on the virtual operation surface R2 corresponding to the display screen 13A, the movement amount acquirer 114 acquires a first movement amount Z1 and a second movement amount. The first movement amount Z1 is a movement amount of the user's operation designator in a vertical direction (the Z-direction) with respect to the virtual operation surface R2, and the second movement amount is a movement amount of the user's operation designator in a horizontal direction (the X-direction and the Y-direction) with respect to the virtual operation surface R2. The operation designator may be a part of the user's body (the hand, the finger, or the like) or an input tool (the stylus pen, the pointer, or the like) that is grasped by the user.

Figure 5A:
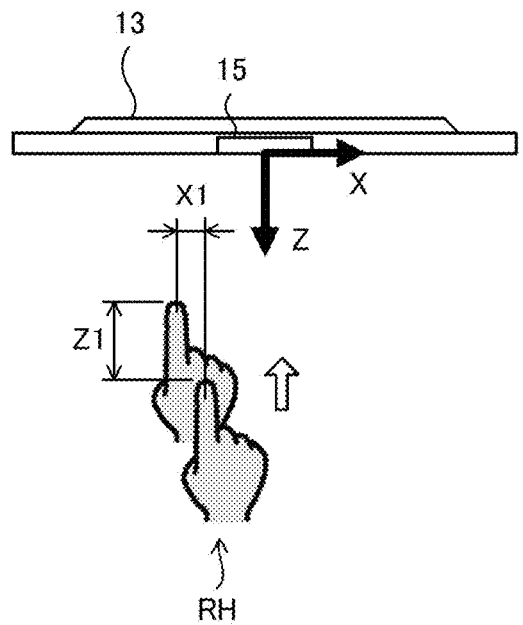
FIG. 5A is a view illustrating an example of the input operation in the display apparatus according to the embodiment of the present disclosure.
Figure 5B:
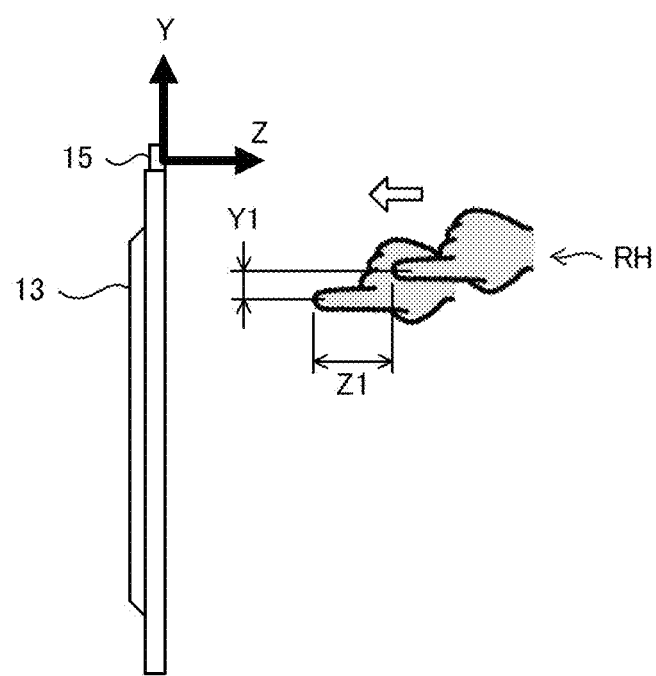
FIG. 5B is a view illustrating an example of the input operation in the display apparatus according to the embodiment of the present disclosure.

FIG. 5A illustrates the first movement amount Z1 in the Z-direction and a second movement amount X1 in the X-direction in the case where the user performs an operation to move (push in) the finger of his/her right hand RH in the vertical direction (the Z-direction) with respect to the display screen 13A (an example of the first operation in the present disclosure). FIG. 5B illustrates the first movement amount Z1 in the Z-direction and a second movement amount Y1 in the Y-direction in the case where the user performs the operation (the first operation) to move (push in) the finger of his/her right hand RH in the vertical direction (the Z-direction) with respect to the display screen 13A. Just as described, even when the user intentionally performs the operation to push in his/her finger in the vertical direction, there is a case where his/her finger also moves in the X-direction or the Y-direction that is unintended by the user. That is, in FIG. 5A and FIG. 5B, the first movement amount Z1 is a movement amount that corresponds to the movement intended by the user, and each of the second movement amounts X1, Y1 is a movement amount that corresponds to the movement unintended by the user.

Figure 6:
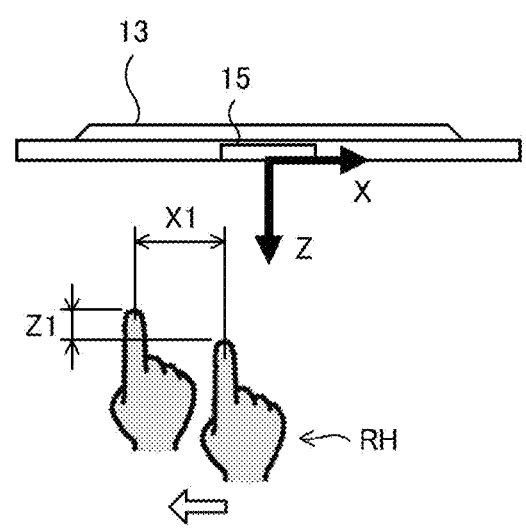
FIG. 6 is a view illustrating an example of the input operation in the display apparatus according to the embodiment of the present disclosure.

FIG. 6 illustrates the second movement amount X1 in the X-direction and the first movement amount Z1 in the Z-direction in the case where the user performs an operation (a second operation) to move the finger of his/her right hand RH in the horizontal direction (the X-direction) with respect to the display screen 13A. Just as described, even when the user intentionally performs the operation to move his/her finger in the horizontal direction, there is a case where his/her finger also moves in the Z-direction that is unintended by the user. That is, in FIG. 6, the second movement amount X1 is the movement amount that corresponds to the movement intended by the user, and the first movement amount Z1 is the movement amount that corresponds to the movement unintended by the user.

The movement amount acquirer 114 acquires the first movement amount Z1 and the second movement amounts X1, Y1 in the user's input operation. The movement amount acquirer 114 is an example of the movement amount acquirer in the present disclosure.

The input operation determination device 115 determines whether the user's input operation is a predetermined operation. Examples of the predetermined operation are the first operation to move the user's hand in the vertical direction (Z-direction) with respect to the display screen 13A (an example of the first operation in the present disclosure) and the second operation to move the user's finger in the horizontal direction (the X-direction and the Y-direction) with respect to the display screen 13A (an example of the second operation in the present disclosure). Information on the predetermined operations is registered in the storage 12 in advance. The input operation determination device 115 is an example of the input operation determination device in the present disclosure.

More specifically, in the case where the first movement amount Z1 exceeds a preset first set value Sth1 (in the case of Z1>Sth1), the input operation determination device 115 determines that the input operation is the first operation. As another embodiment, in the case where a ratio of the first movement amount Z1 to one of the second movement amounts X1, Y1 is higher than a preset second set value Sth2 (in the case of (Z1/X1)>Sth2 or (Z1/Y1)>Sth2), the input operation determination device 115 may determine that the input operation is the first operation.

In the case where one of the second movement amounts X1, Y1 exceeds a preset third set value Sth3 (in the case of X1>Sth3 or Y1>Sth3), the input operation determination device 115 determines that the input operation is the second operation. As another embodiment, in the case where a ratio of one of the second movement amounts X1, Y1 to the first movement amount Z1 is higher than a preset fourth set value Sth4 (in the case of (X1/Z1)>Sth4 or (Y1/Z1)>Sth4), the input operation determination device 115 may determine that the input operation is the second operation.

In the case where the input operation determination device 115 determines that the input operation is the predetermined operation, the movement amount corrector 116 executes correction processing to correct the first movement amount Z1 or the second movement amounts X1, Y1. More specifically, in the case where the input operation determination device 115 determines that the input operation is the first operation to move the user's finger in the vertical direction (the Z-direction) with respect to the virtual operation surface R2, the movement amount corrector 116 executes the correction processing to reduce or ignore the second movement amounts X1, Y1. For example, in the examples illustrated in FIG. 5A and FIG. 5B, in the case where it is determined that the input operation is the first operation, the movement amount corrector 116 corrects the second movement amounts X1, Y1 to "0".

In addition, in the case where the input operation determination device 115 determines that the input operation is the second operation to move the user's finger in the horizontal direction (the X-direction and the Y-direction) with respect to the virtual operation surface R2, the movement amount corrector 116 executes correction processing to reduce or ignore the first movement amount Z1. For example, in the example illustrated in FIG. 6, in the case where it is determined that the input operation is the second operation, the movement amount corrector 116 corrects the first movement amount Z1 to "0". The movement amount corrector 116 is an example of the movement amount corrector in the present disclosure.

The input processor 113 executes the input processing that corresponds to the input operation on the basis of the first movement amount Z1 and the second movement amounts X1, Y1. In addition, in the case where the input operation determination device 115 determines that the input operation is the predetermined operation, the input processor 113 executes the input processing that corresponds to the input operation on the basis of a first movement amount Z1' and second movement amounts X1', Y1' after the correction processing. More specifically, the input processor 113 executes processing to move the cursor image (see FIG. 3) displayed on the display screen 13A on the basis of the second movement amounts X1, Y1 and the first movement amount Z1' after the correction processing. Furthermore, the input processor 113 executes processing to select a selection target image (the selection button image "ORDER" in FIG. 3) that the cursor image (see FIG. 3) overlaps among the selection target images displayed on the display screen 13A on the basis of the first movement amount Z1 and the second movement amounts X1', Y1' after the correction processing. The input processor 113 is an example of the input processor in the present disclosure.

For example, as illustrated in FIG. 3, in the case where the user performs the operation (the second operation) to move his/her finger in the horizontal direction (the left direction), the input processor 113 ignores the first movement amount Z1 (Z1'=0) and moves the cursor image to a position corresponding to the second movement amounts X1, Y1. In addition, for example, as illustrated in FIG. 3, in the case where the user performs the operation (the first operation) to move (push in) his/her finger in the vertical direction (a display screen 13A direction), the input processor 113 ignores the second movement amounts X1, Y1 (X1'=0, Y1'=0), accepts push-in of the selection button image "ORDER" according to the first movement amount Z1, and executes the order processing.

Display Control Processing

Figure 7:
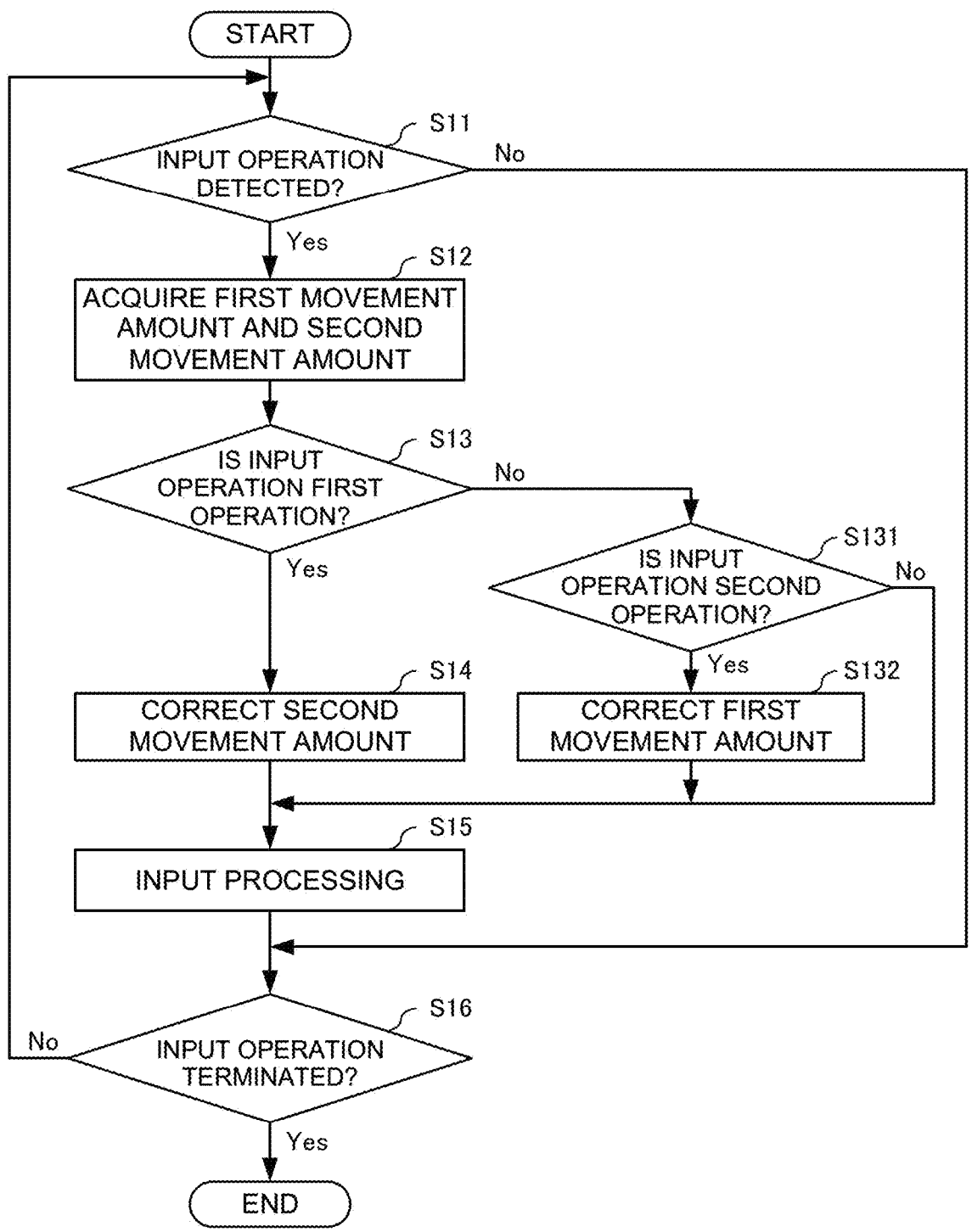
FIG. 7 is a flowchart for explaining an example of a procedure of display control processing that is executed by the display apparatus according to the embodiment of the present disclosure.

A description will hereinafter be made on the display control processing that is executed by the controller 11 of the display apparatus 1 with reference to FIG. 7.

The present disclosure can be understood as disclosure of a display control method (an example of the display method in the present disclosure) for executing one or plural steps included in the display control processing, and one or plural steps included in the display control processing, which will be described herein, may appropriately be omitted. Steps in the display control processing may be executed in a different order as long as similar operational effects can be exerted. Furthermore, a description will herein be made on a case where the controller 11 executes each of the steps in the display control processing as an example. However, a display control method in which plural processors execute the steps in the display control method in a distributed manner is also regarded as another embodiment.

First, in step S11, the controller 11 determines whether the user's input operation is detected. More specifically, the controller 11 detects the user's input operation on the virtual operation surface R2. For example, the controller 11 detects the detection coordinates in the virtual operation surface R2 on the basis of the detection information acquired from the motion sensor 15, and calculates the input coordinates in the operation area R1 of the display screen 13A from the detection coordinates. If the controller 11 detects the input operation (S11: Yes), the processing proceeds to step S12. If the controller 11 does not detect the input operation (S11: No), the processing proceeds to step S16.

In step S12, the controller 11 acquires the first movement amount Z1, which is the movement amount of the user's finger in the vertical direction (the Z-direction) with respect to the virtual operation surface R2, and the second movement amounts X1, Y1, each of which is the movement amount of the user's finger in the horizontal direction with respect to the virtual operation surface R2, in the user's input operation on the virtual operation surface R2. Step S12 is an example of acquiring the movement amount in the present disclosure.

Next, in step S13, the controller 11 determines whether the user's input operation is the first operation to move the user's finger in the vertical direction (the Z-direction) with respect to the virtual operation surface R2. If the input operation is the first operation (S13: Yes), the processing proceeds to step S14. If the input operation is not the first operation (S13: No), the processing proceeds to step S131. Step S13 is an example of determining the input operation in the present disclosure.

In step S14, the controller 11 executes the correction processing to reduce or ignore the second movement amounts X1, Y1. In the examples illustrated in FIG. 5A and FIG. 5B, in the case where the controller 11 determines that the input operation is the first operation, the controller 11 corrects the second movement amounts X1, Y1 to "0". Then, the processing proceeds to Step S15. Step S14 is an example of correcting the movement amount in the present disclosure.

In step S131, the controller 11 determines whether the user's input operation is the second operation to move the user's finger in the horizontal direction (the X-direction and the Y-direction) with respect to the virtual operation surface R2. If the input operation is the second operation (S131: Yes), the processing proceeds to step S132. If the input operation is not the second operation (S131: No), the processing proceeds to step S15. Step S131 is an example of determining the input operation in the present disclosure.

In step S132, the controller 11 executes the correction processing to reduce or ignore the first movement amounts Z1. In the example illustrated in FIG. 6, in the case where the controller 11 determines that the input operation is the second operation, the controller 11 corrects the first movement amount Z1 to "0". Step S132 is an example of correcting the movement amount in the present disclosure. Then, the processing proceeds to Step S15.

In step S15, the controller 11 executes the input processing according to the user's input operation.

More specifically, in the case where the controller 11 determines that the input operation is the first operation and corrects the second movement amounts X1, Y1 to "0" (S14), the controller 11 executes the processing to select the selection target image, on which the cursor image (see FIG. 3) overlaps, among the selection target images displayed on the display screen 13A on the basis of the first movement amount Z1 and the second movement amounts X1', Y1' (X1'=0, Y1'=0) after the correction processing.

Meanwhile, in the case where the controller 11 determines that the input operation is the second operation and corrects the first movement amount Z1 to "0" (S132), the controller 11 executes the processing to move the cursor image (see FIG. 3) displayed on the display screen 13A in the horizontal direction on the basis of the second movement amounts X1, Y1 and the first movement amount Z1' (Z1'=0) after the correction processing.

Here, if the input operation is neither the first operation nor the second operation (S131: No), the controller 11 executes processing to move the cursor image displayed on the display screen 13A or processing to select the selection target image on the basis of the first movement amount Z1 and the second movement amounts X1, Y1. Step S15 is an example of inputting in the present disclosure.

In step S16, the controller 11 determines whether the input operation is terminated. If the input operation is terminated (S16: Yes), the controller 11 terminates the display control processing. If the input operation is not terminated (S16: No), the processing returns to step S11, and the controller 11 repeats the above-described processing.

As it has been described so far, the display apparatus 1 according to this embodiment is a display apparatus that accepts the user's non-contact input operation for the display screen 13A. In addition, in the user's input operation on the virtual operation surface R2 corresponding to the display screen 13A, the display apparatus 1 acquires the first movement amount Z1, which is the movement amount of the user's operation designator (for example, the finger) in the vertical direction (the Z-direction) with respect to the virtual operation surface R2, and the second movement amounts X1, Y1, which are the movement amounts in the horizontal direction (the X-direction and the Y-direction) with respect to the virtual operation surface R2. Furthermore, in the case where the display apparatus 1 determines that the input operation is the predetermined operation, the display apparatus 1 executes the correction processing to correct the first movement amount Z1 or the second movement amounts X1, Y1, and executes the input processing that corresponds to the input operation on the basis of the first movement amount Z1' or the second movement amounts X1', Y1' after the correction processing.

More specifically, in the case where the display apparatus 1 determines that the input operation is the first operation to move the user's hand in the vertical direction (the Z-direction) with respect to the virtual operation surface R2, the display apparatus 1 executes the correction processing to reduce or ignore the second movement amounts X1, Y1. Meanwhile, in the case where the display apparatus 1 determines that the input operation is the second operation to move the user's hand in the horizontal direction (the X-direction or the Y-direction) with respect to the virtual operation surface R2, the display apparatus 1 executes the correction processing to reduce or ignore the first movement amount Z1.

With this configuration, it is possible to suppress the movement amount in the direction unintended by the user and thus to execute the input processing that corresponds to the user's intended operation. Therefore, it is possible to suppress the misalignment of the user's input operation to the virtual operation surface R2.

The present disclosure is not limited to the above-described embodiment. As another embodiment, it may be configured that, in the case where the input operation determination device 115 determines that the input operation is the first operation, the movement amount corrector 116 does not execute the correction processing to reduce or ignore the second movement amounts X1, Y1 when the cursor image does not overlap the selection target image, and the movement amount corrector 116 executes the correction processing to reduce or ignore the second movement amounts X1, Y1 when the cursor image overlaps the selection target image.

For example, as illustrated in FIG. 3, in the case where the user moves his/her hand and the cursor image overlaps the selection button image "ORDER", it is considered that the user intends to perform the operation of pressing (selecting) "ORDER". Accordingly, in the case where the cursor image overlaps the selection button image "ORDER", the controller 11 executes the correction processing to reduce or ignore the second movement amounts X1, Y1. In this way, it is possible to reliably accept the user's intended operation. On the contrary, in the case where the cursor image does not overlap the selection button image "ORDER", it is considered that the user will further move his/her hand in the right-left direction. Thus, the controller 11 does not execute the correction processing to reduce or ignore the second movement amounts X1, Y1.

Setting Method of Virtual Operation Surface

The operation surface setting device 111 may set the virtual operation surface R2 in the desired size to the desired position on the basis of the user's predetermined gesture operation.

More specifically, the operation surface setting device 111 detects the user's gesture operation. More specifically, the operation surface setting device 111 detects the gesture operation on the basis of the detection information that is acquired from the motion sensor 15. For example, the operation surface setting device 111 specifies a shape of the user's hand on the basis of the coordinate information included in the detection information, and specifies the corresponding gesture operation of the plural gesture operations that are registered in the storage 12 in advance.

When detecting the user's predetermined first gesture operation, the operation surface setting device 111 sets an area corresponding to the first gesture operation as the virtual operation surface R2 on which the user's input operation for the display screen 13A is accepted. Here, the operation surface setting device 111 may set the virtual operation surface R2 in the case where the first gesture operation is performed continuously for a predetermined time. An example of the first gesture operation is an operation of holding the palms of the left hand LH and the right hand RH toward the display screen 13A. That is, the first gesture operation is a setting operation for the user to set the virtual operation surface R2.

Figure 8:
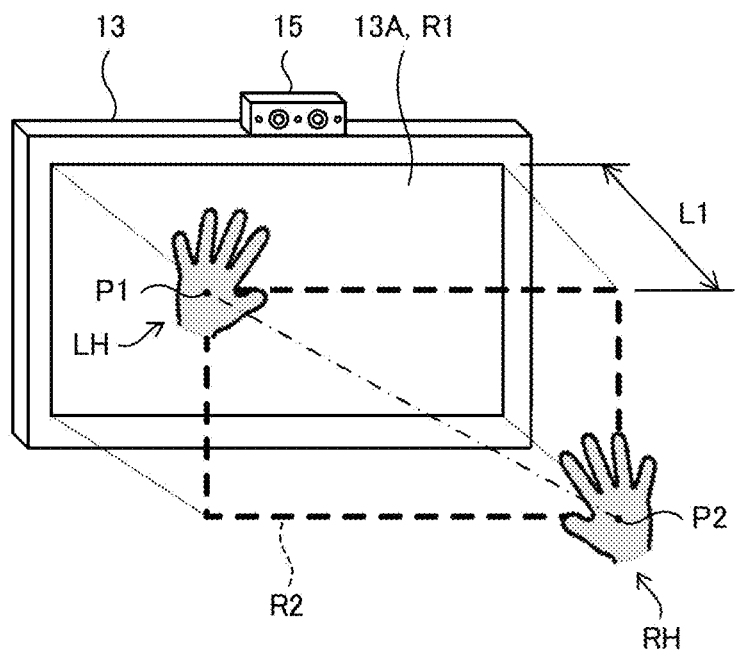
FIG. 8 is a view illustrating an example of a setting method of the virtual operation surface in the display apparatus according to the embodiment of the present disclosure.

For example, as illustrated in FIG. 8, when the user holds the palm of his/her left hand LH to an upper-left position of the display screen 13A and holds the palm of his/her right hand RH to a lower-right position of the display screen 13A, the operation surface setting device 111 detects coordinates P1 of the left hand LH, coordinates P2 of the right hand RH, and the first gesture operation of holding the left hand LH and the right hand RH on the basis of the detection information acquired from the motion sensor 15. When detecting the first gesture operation, the operation surface setting device 111 sets the virtual operation surface R2 on the basis of the coordinates P1 of the left hand LH and the coordinates P2 of the right hand RH.

For example, as illustrated in FIG. 8, the operation surface setting device 111 sets the rectangular virtual operation surface R2 having, as a diagonal line, a line that connects the position (the coordinates P1) of the left hand LH and the position (the coordinates P2) of the right hand RH. More specifically, the operation surface setting device 111 calculates the coordinates C21 to C24 (see FIG. 2) of the corners of the rectangle on the basis of the coordinates P1 of the left hand LH and the coordinates P2 of the right hand RH, and sets the virtual operation surface R2.

In addition, for example, the operation surface setting device 111 sets the virtual operation surface R2 at a position away from the display screen 13A by a predetermined distance L1. The predetermined distance L1 is a distance that corresponds to the coordinate P1 (the Z-coordinate) of the left hand LH and the coordinate P2 (the Z-coordinate) of the right hand RH.

Figure 9:
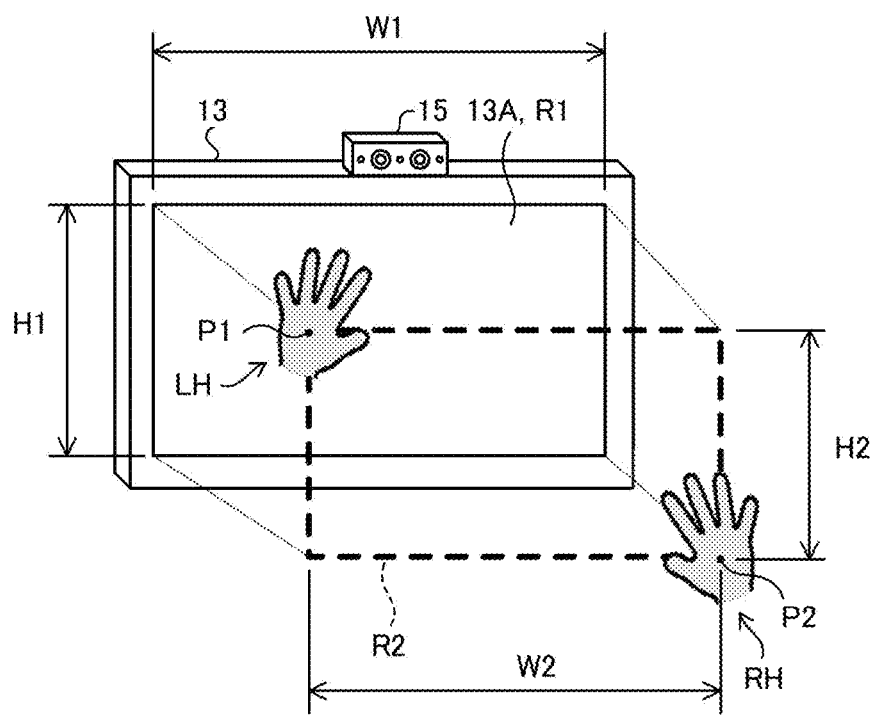
FIG. 9 is a view illustrating an example of the setting method of the virtual operation surface in the display apparatus according to the embodiment of the present disclosure.

Furthermore, for example, the operation surface setting device 111 may set the virtual operation surface R2, an aspect ratio of which is the same as an aspect ratio of the display screen 13A. More specifically, as illustrated in FIG. 9, the operation surface setting device 111 sets such a virtual operation surface R2 that the aspect ratio (H1:W1) of the display screen 13A and the aspect ratio (H2:W2) of the virtual operation surface R2 are the same (H1:W1=H2:W2).

Just as described, the size of the display screen 13A (the operation area R1) may be the same as or different from the size of the virtual operation surface R2. Here, the virtual operation surface R2 that is smaller than the operation area R1 is preferred for application in which the large-sized display panel 13 is operated close at the user's hand. Meanwhile, the virtual operation surface R2 that is larger than the operation area R1 is preferred for application in which the small-sized display panel 13 is operated at a position away therefrom.

Figure 10:
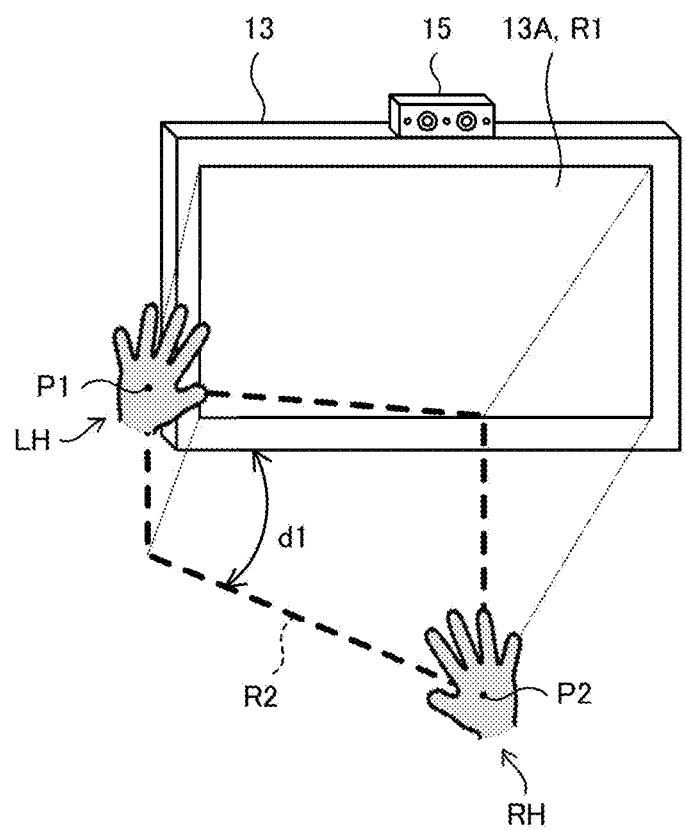
FIG. 10 is a view illustrating an example of the setting method of the virtual operation surface in the display apparatus according to the embodiment of the present disclosure.

In addition, as illustrated in FIG. 10, the operation surface setting device 111 may set the virtual operation surface R2 having a predetermined angle d1 that is not parallel to the display screen 13A. That is, the virtual operation surface R2 may be set in an oblique direction to the display screen 13A. For example, the operation surface setting device 111 sets the predetermined angle d1 on the basis of the coordinate P1 (the Z-coordinate) of the left hand LH and the coordinate P2 (the Z-coordinate) of the right hand RH. In this way, the user can perform the input operation from the oblique direction to the display screen 13A. Here, the operation surface setting device 111 may display information on the predetermined angle d1 on the display screen 13A. In this way, the user can comprehend the angle (a degree of inclination) of the virtual operation surface R2 with respect to the display screen 13A.

Figure 11:
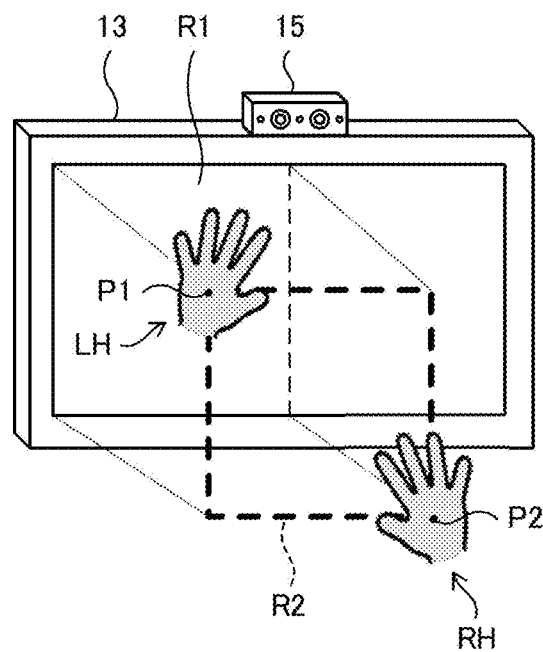
FIG. 11 is a view illustrating an example of the setting method of the virtual operation surface in the display apparatus according to the embodiment of the present disclosure.
Figure 12:
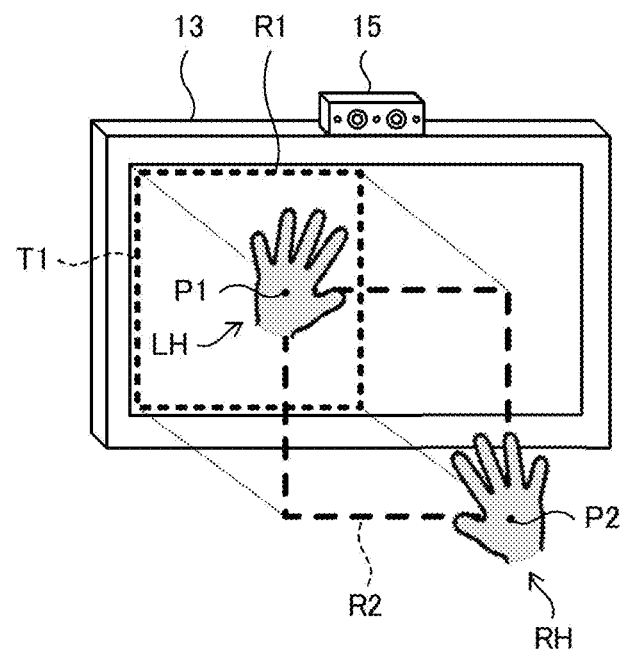
FIG. 12 is a view illustrating an example of the setting method of the virtual operation surface in the display apparatus according to the embodiment of the present disclosure.

The operation surface setting device 111 may set the virtual operation surface R2 that corresponds to a part of the area of the display screen 13A. For example, as illustrated in FIG. 11, the operation surface setting device 111 sets the virtual operation surface R2 that corresponds to the operation area R1 of the part (a left area) of the display screen 13A. A position and size of the operation area R1 can be set by the user's setting operation. Here, in order for the user who sets the virtual operation surface R2 to easily comprehend the operation area R1, as illustrated in FIG. 12, the operation surface setting device 111 may display an object image T1 indicating the operation area R1 on the display screen 13A at the time of setting the virtual operation surface R2.

The operation surface setting device 111 can set the virtual operation area R2 that is associated with the operation area R1 of the display screen 13A on the basis of coordinates corresponding to the first gesture operation by using well-known coordinate transformation (projective transformation, affine transformation, or the like).

The operation surface setting device 111 may execute processing to adjust the set virtual operation surface R2. More specifically, in the case where the operation surface setting device 111 detects the user's predetermined second gesture operation after setting the virtual operation surface R2, the operation surface setting device 111 changes at least one of the size and the position of the virtual operation surface R2 on the basis of the second gesture operation. An example of the second gesture operation is a pointing operation with the right hand RH (see FIG. 13).

Figure 13:
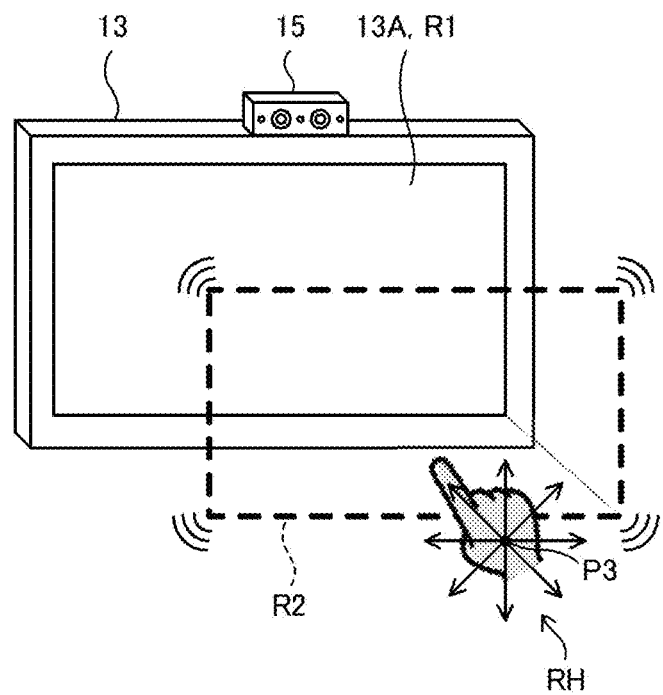
FIG. 13 is a view illustrating an example of the setting method of the virtual operation surface in the display apparatus according to the embodiment of the present disclosure.

For example, as illustrated in FIG. 13, in the case where the user points at the display screen 13A with his/her right hand RH after setting of the virtual operation surface R2, the operation surface setting device 111 detects coordinates P3 of the right hand RH and the second gesture operation of the pointing operation by the right hand RH on the basis of the detection information acquired from the motion sensor 15. When detecting the second gesture operation, the operation surface setting device 111 sets the virtual operation surface R2 to be movable on the basis of the coordinates P3 of the right hand RH, and accepts the movement operation of the virtual operation surface R2 by the user. For example, in the case where the user moves his/her right hand RH while keeping a pointing state, the operation surface setting device 111 moves the virtual operation surface R2 in the left direction by an amount corresponding to a movement amount of the right hand RH. That is, the operation surface setting device 111 sets the virtual operation surface R2 at the coordinates P3 of the right hand RH after the movement.

Figure 14:
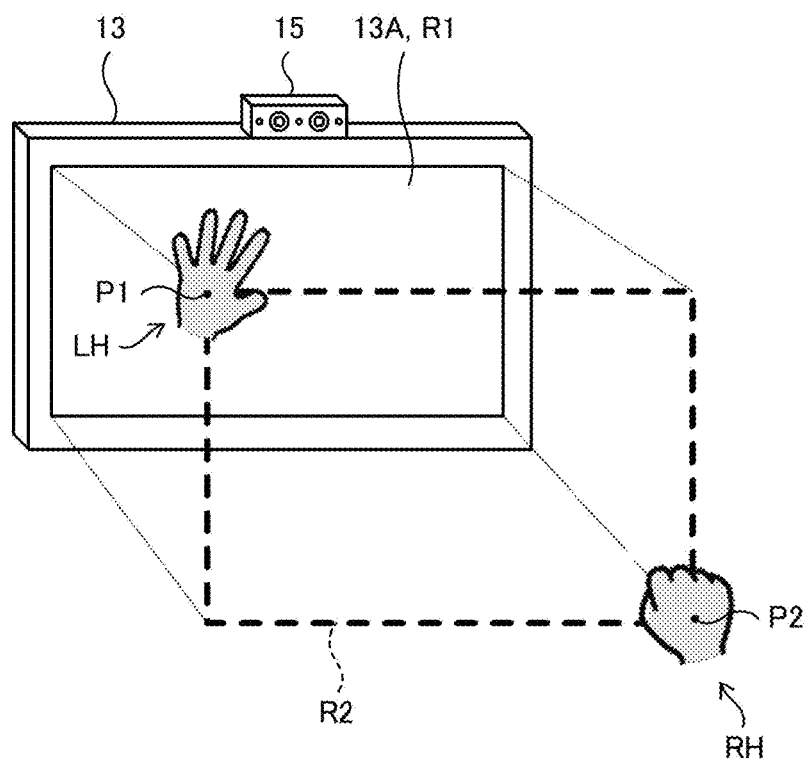
FIG. 14 is a view illustrating an example of the setting method of the virtual operation surface in the display apparatus according to the embodiment of the present disclosure.

For example, as illustrated in FIG. 14, in the case where the user makes a first with his/her right hand RH while holding the palm of his/her left hand LH after setting of the virtual operation surface R2, the operation surface setting device 111 detects the coordinates P1 of the left hand LH, the coordinates P2 of the right hand RH, and the second gesture operation of holding the left hand LH and making the first with the right hand RH on the basis of the detection information acquired from the motion sensor 15. When detecting the second gesture operation, the operation surface setting device 111 sets the size of the virtual operation surface R2 to be changeable on the basis of the coordinates P2 of the right hand RH, and accepts a changing operation of the size of the virtual operation surface R2 by the user. For example, in the case where the user moves his/her right hand RH in a lower-right direction while keeping the first with his/her right hand RH, the operation surface setting device 111 increases the size (an area) of the virtual operation surface R2 by an amount corresponding to the movement amount of the right hand RH. That is, the operation surface setting device 111 sets the virtual operation surface R2 that is defined by the coordinates P1 of the left hand LH and the coordinates P2 of the right hand RH.

Figure 15:
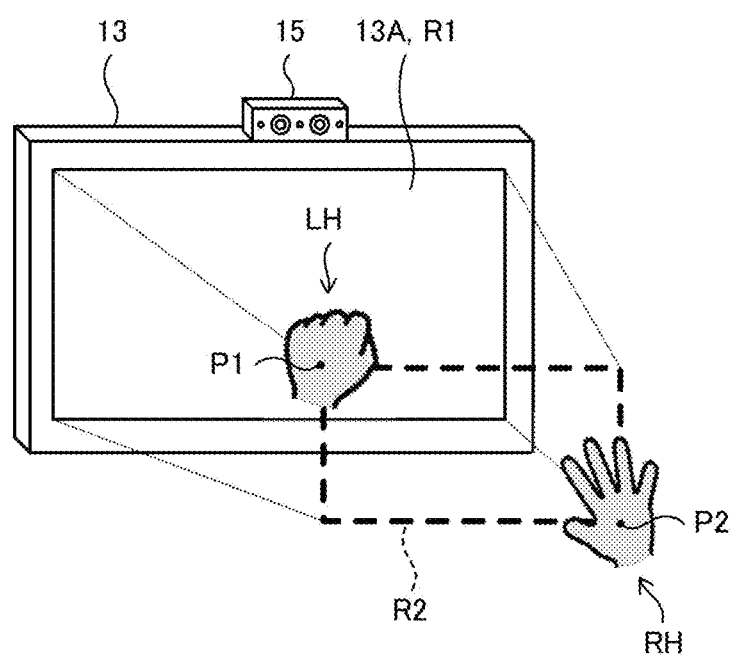
FIG. 15 is a view illustrating an example of the setting method of the virtual operation surface in the display apparatus according to the embodiment of the present disclosure.

An example illustrated in FIG. 15 is an example of a case where the user performs an operation of making a first with his/her left hand LH while holding his/her right hand RH after setting of the virtual operation surface R2. In this case, based on the detection information acquired from the motion sensor 15, the operation surface setting device 111 detects the coordinates P1 of the left hand LH, the coordinates P2 of the right hand RH, and the second gesture operation of holding the right hand RH and making the first with the left hand LH. When detecting the second gesture operation, the operation surface setting device 111 sets the size of the virtual operation surface R2 to be changeable on the basis of the coordinates P1 of the left hand LH, and accepts the changing operation of the size of the virtual operation surface R2 by the user. For example, in the case where the user moves his/her left hand LH in the lower-right direction while keeping the first with his/her left hand LH, the operation surface setting device 111 reduces the size (the area) of the virtual operation surface R2 by an amount corresponding to the movement amount of the left hand LH. That is, the operation surface setting device 111 sets the virtual operation surface R2 that is defined by the coordinates P2 of the right hand RH and the coordinates P1 of the left hand LH.

Figure 16:
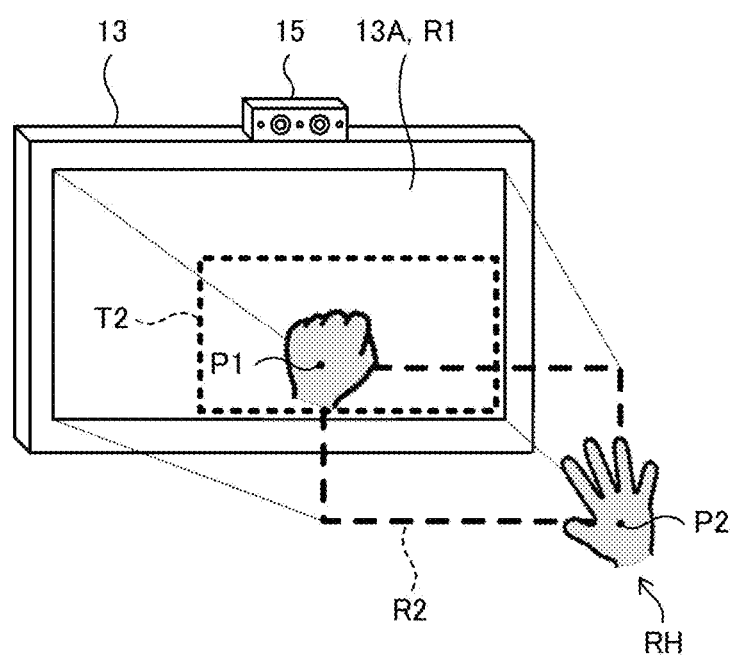
FIG. 16 is a view illustrating an example of the setting method of the virtual operation surface in the display apparatus according to the embodiment of the present disclosure.

In the case where the operation surface setting device 111 detects the second gesture operation after setting the virtual operation surface R2, the operation surface setting device 111 may display an object image T2 indicating the virtual operation surface R2 on the display screen 13A according to the second gesture operation. FIG. 16 illustrates an example of the object image T2 that indicates the virtual operation surface R2 after the size thereof is changed. With this configuration, the user can visually comprehend the size, the position, and the like of the virtual operation surface R2 after the change.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A display apparatus that accepts a non-contact input operation by a user for a display screen, the display apparatus comprising:
    a movement amount acquirer that acquires a first movement amount and a second movement amount in an input operation by the user on a virtual operation surface corresponding to the display screen, the first movement amount being a movement amount of an operation designator of the user in a vertical direction with respect to the virtual operation surface, and the second movement amount being a movement amount of the operation designator of the user in a horizontal direction with respect to the virtual operation surface;
    an input operation determination device that determines whether the input operation is a predetermined operation;
    a movement amount corrector that executes correction processing to correct the first movement amount or the second movement amount when the input operation determination device determines that the input operation is the predetermined operation; and
    an input processor that executes input processing corresponding to the input operation based on the first movement amount and the second movement amount, after the movement amount corrector has corrected the first movement amount or the second movement amount, wherein:
    when the input operation determination device determines that the input operation is a first operation to move the operation designator of the user in the vertical direction with respect to the virtual operation surface, the movement amount corrector executes the correction processing to reduce or ignore the second movement amount depending on a position of a cursor image displayed on the display screen,
    the input processor further executes processing to move the cursor image displayed on the display screen based on the first movement amount after the execution of the correction processing,
    the input processor further executes processing to select a selection target image with which the cursor image overlaps among selection target images displayed on the display screen based on the second movement amount after the execution of the correction processing,
    when the input operation determination device determines that the input operation is the first operation and the cursor image does not overlap the selection target image, the movement amount corrector does not execute the correction processing to reduce or ignore the second movement amount, and
    when the input operation determination device determines that the input operation is the first operation and the cursor image overlaps the selection target image, the movement amount corrector executes the correction processing to reduce or ignore the second movement amount.

2. The display apparatus according to claim 1, wherein when the first movement amount exceeds a preset first set value, the input operation determination device determines that the input operation is the first operation.

3. The display apparatus according to claim 1, wherein when a ratio of the first movement amount to the second movement amount is higher than a preset second set value, the input operation determination device determines that the input operation is the first operation.

4. The display apparatus according to claim 1, wherein when the input operation determination device determines that the input operation is a second operation to move the operation designator of the user in the horizontal direction with respect to the virtual operation surface, the movement amount corrector executes the correction processing to reduce or ignore the first movement amount.

5. The display apparatus according to claim 4, wherein when the second movement amount exceeds a preset third set value, the input operation determination device determines that the input operation is the second operation.

6. The display apparatus according to claim 4, wherein when a ratio of the second movement amount to the first movement amount is higher than a preset fourth set value, the input operation determination device determines that the input operation is the second operation.

7. A display method for accepting a non-contact input operation by a user for a display screen, the display method performing, by one or a plurality of processors:
    acquiring a first movement amount and a second movement amount in an input operation by the user on a virtual operation surface corresponding to the display screen, the first movement amount being a movement amount of an operation designator of the user in a vertical direction with respect to the virtual operation surface, and the second movement amount being a movement amount of the operation designator of the user in a horizontal direction with respect to the virtual operation surface;
    determining whether the input operation is a predetermined operation;
    executing correction processing to correct the first movement amount or the second movement amount the input operation is determined to be the predetermined operation; and
    executing input processing that corresponds to the input operation based on the first movement amount and the second movement amount, after one of the first movement amount or the second movement amount has been corrected, wherein:
    when the input operation is determined to be a first operation to move the operation designator of the user in the vertical direction with respect to the virtual operation surface, executing the correction processing reduce or ignore the second movement amount depending on a position of a cursor image displayed on the display screen.

8. A non-transitory computer-readable recording medium recording a display program that accepts a non-contact input operation by a user for a display screen, the recording medium recording the display program causing one or a plurality of processors to execute:

acquiring a first movement amount and a second movement amount in an input operation by the user on a virtual operation surface corresponding to the display screen, the first movement amount being a movement amount of an operation designator of the user in a vertical direction with respect to the virtual operation surface, and the second movement amount being a movement amount of the operation designator of the user in a horizontal direction with respect to the virtual operation surface;

determining whether the input operation is a predetermined operation;

executing correction processing to correct the first movement amount or the second movement amount when the input operation is determined to be the predetermined operation; and executing input processing that corresponds to the input operation based on the first movement amount and the second movement amount, after one of the first movement amount or the second movement amount has been corrected, wherein:

when the input operation is determined to be a first operation to move the operation designator of the user in the vertical direction with respect to the virtual operation surface, executing the correction processing to reduce or ignore the second movement amount depending on a position of a cursor image displayed on the display screen.

* * * * *